(No Model.) 2 Sheets—Sheet 1.
W. H. H. SHEETS.
GATE VALVE.

No. 565,239. Patented Aug. 4, 1896.

Witnesses
Robt. C. Totten
Chas. J. Farrar

Inventor
William H. H. Sheets
By S. Kay Totten
Attorneys

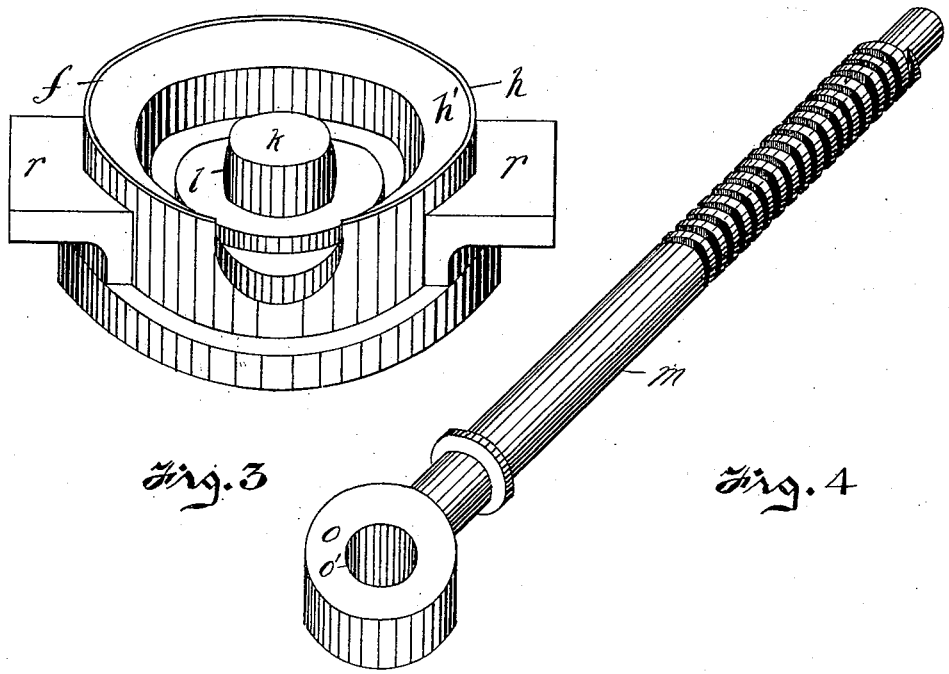
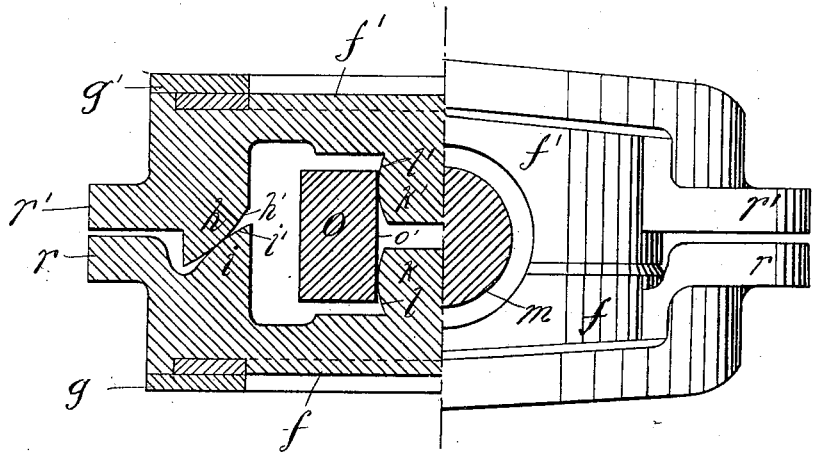

UNITED STATES PATENT OFFICE.

WILLIAM H. H. SHEETS, OF PITTSBURG, PENNSYLVANIA.

GATE-VALVE.

SPECIFICATION forming part of Letters Patent No. 565,239, dated August 4, 1896.

Application filed September 20, 1895. Serial No. 563,102. (No model.)

*To all whom it may concern:*

Be it known that I, WILLIAM H. H. SHEETS, a resident of Pittsburg, in the county of Allegheny and State of Pennsylvania, have invented a new and useful Improvement in Gate-Valves; and I do hereby declare the following to be a full, clear, and exact description thereof.

My invention relates to valves, and more particularly to what are generally termed "gate-valves."

The chief object of my invention is to provide a valve in which the valve-disk can conform itself to the valve-seat at all times and so form a very tight connection with the valve-seat.

My invention comprises, generally stated, a gate-valve having a disk formed of two halves, the said halves having their bearing-faces of such form as to enable said halves to adjust themselves in such position with reference to the valve-seats as to afford a very tight connection.

To enable others skilled in the art to make and use my invention, I will describe the same more fully, referring to the accompanying drawings, in which—

Figure 1:
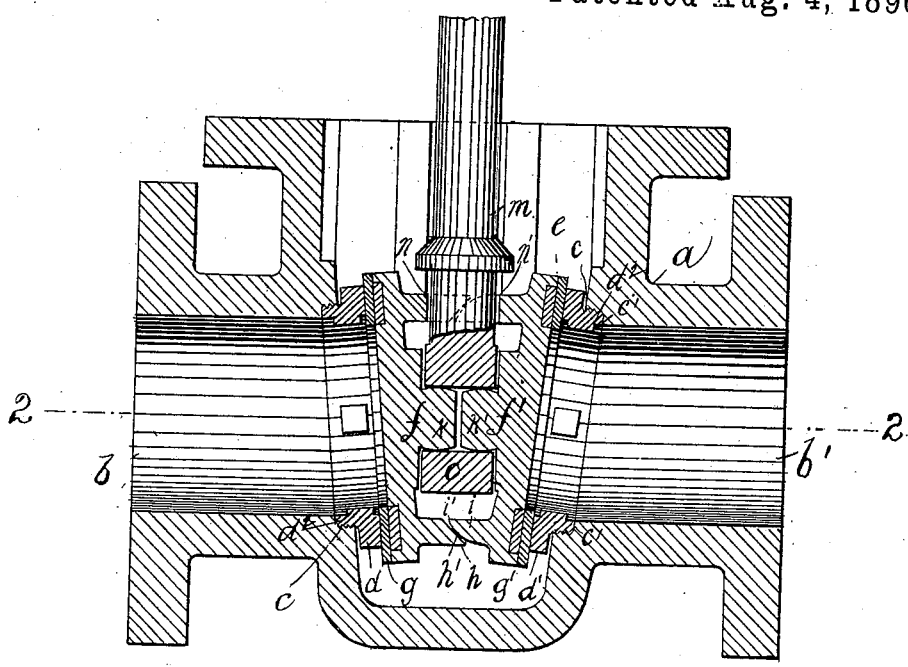
Figure 2:
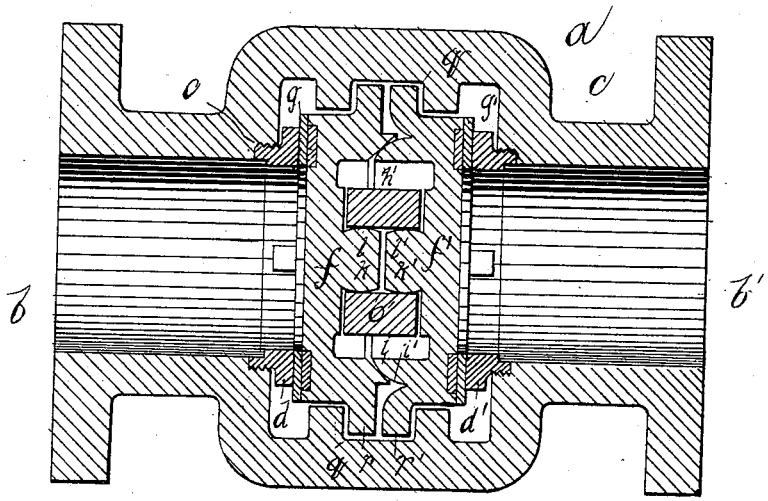

Figure 1 is a longitudinal section of my improved valve. Fig. 2 is a section on the line 2 2, Fig. 1. Fig. 3 is a perspective view of one of the disk halves, showing the interior thereof. Fig. 4 is a perspective view of the valve-stem, and Fig. 5 is a view of a modified form of my invention.

Like letters indicate like parts in each of the figures.

The valve-casing $a$ may be of any suitable construction, having the inlet and outlet ports $b\ b'$. The casing $a$ has formed therein the annular threaded seats $c$ to receive the threaded brass rings $d\ d'$, which form the seat for the valve-disk. These brass rings $d\ d'$ are inclined toward each other to form a wedge-shaped recess $e$ for the reception of the valve-disk. The seats $c$ have the shoulders $c'$, against which the inner ends $d^2$ of the rings $d\ d'$ are adapted to press, whereby in conjunction with the parts hereinafter described a very close joint is formed between the seats $c$ and the rings $d\ d'$. Furthermore the rings $d\ d'$ are easily removed and can be replaced by new ones when necessary.

The valve-disk is composed of the two halves $f\ f'$, said halves being formed of any suitable metal having the brass or other suitable rings $g\ g'$, adapted to engage with the brass rings $d\ d'$ of the valve-seat. The disk half $f$ has the inwardly-projecting flange $h$, said flange having the beveled bearing-face $h'$. The flange $h$ is wider at the top of said disk half than at the bottom, the diminution in size being a gradual one. The disk half $f'$ has also an inwardly-projecting flange $i$, said flange having a curved bearing-face $i'$. This flange $i$ is likewise wider at the top of said disk half $f'$ than at the bottom, so that when the two disk halves have their bearing-faces $h'$ and $i'$ in engagement with each other said disk halves will form a wedge-shaped disk adapted to correspond with the wedge-shaped seat $e$ in the valve. Instead, however, of having a curved and a beveled face, two curved faces may be employed, as shown in Fig. 5.

The flanges $h$ and $i$ are preferably arranged to be practically in alinement with the rings $d\ d'$, which form the tapering valve-seat. The disk halves $f\ f'$ have the bosses $k\ k'$ on their inner faces, said bosses having their peripheries slightly rounded, as at $l\ l'$. When the disk halves are in engagement, the bosses $k\ k'$ will not be in contact with each other. A valve-stem $m$ passes down through the opening formed by the coincident grooves $n\ n'$ in the flanges $h$ and $i$, said valve-stem having at its lower end a ring $o$, the inner face $o'$ of said ring being straight and adapted to engage the curved faces $l\ l'$ of the bosses $k\ k'$. If desired, the inner face of the ring $o$ may be convex and the peripheries of the bosses may be straight without changing the operation of the device.

The upper end of the valve-stem $m$ is threaded in the ordinary manner and is elevated or lowered by the ordinary hand-wheel. The casing $a$ has formed therein the guides $q$, adapted to receive the lugs $r\ r'$ on the disk halves $f\ f'$. In this manner the disk halves are held in engagement with each other and are guided into or out of position.

When my improved valve is in use, the valve-stem is lowered until the rings $g\ g'$ seat themselves against the rings $d\ d'$. It is apparent that upon forcing down the disk the two disk halves are free to conform to the valve-seat, owing to the fact that the disk is made in two halves and these halves bear against one another. By having one of the flanges, $h$, with a beveled bearing-face $h'$ and the other flange, $i$, with a curved bearing-face $i'$ the disk halves are free to move with reference to each other in order to bring their bearing-rings $g\ g'$ into close connection with the bearing-rings $d\ d'$. This result is further aided by having the bosses $k\ k'$ with the curved faces $l\ l'$ in engagement with the straight face $o'$ of the ring $o$ of the valve-stem. This permits of a certain amount of play on the part of the disk halves, so that when they are seated on the valve-seat one of said halves can suit itself to the portion of the seat with which it engages, while the other conforms to the opposite seat in the same manner. Heretofore it has been practically impossible to construct the valve-disk and the valve-seat so true that at all times a perfect fit would be obtained between the two. The disk might fit perfectly in one position, but in a changed position might not form a perfect fit. By my invention the disk halves are always in position to conform to the valve-seat under all conditions. By having the valve-seat in line with the flanges of the disk halves I prevent the dishing of said halves, as said disks are not only supported against pressure at their centers, but also near their circumferences. This construction keeps the valve true and even on its bearing-face and insures a close connection with the valve-seat. The flanges of the disks being in line with the rings $d\ d'$ and the inner ends of said rings abutting against the shoulders $c'$, there is practically a solid line of metal from the shoulder of one ring to that of the other, so that when said disks are seated there is a strong pressure on the rings to force them tightly against the shoulders $c'$.

What I claim as my invention, and desire to secure by Letters Patent, is—

1. A gate-valve having a disk formed of two separate halves, one of said halves having a curved bearing-face and the other having a beveled bearing-face, said faces engaging one another, substantially as and for the purposes set forth.

2. A gate-valve having a disk composed of two separate halves, said halves having inwardly-projecting flanges, the flange of one of said halves having a curved bearing-face, and the flange of the other half having a beveled face, said faces engaging with one another, said flanges being larger at the upper end of said disk halves and gradually tapering to a smaller width at the lower end thereof, substantially as and for the purposes set forth.

3. A gate-valve having a disk composed of two separate halves, one of said halves having a curved bearing-face and the other of said halves having a beveled bearing-face, said faces engaging with one another, bosses on said halves, said bosses having curved bearing-faces, and a valve-stem having a ring with a straight inner face engaging said bosses, substantially as and for the purposes set forth.

4. In a gate-valve, the combination with a suitable shell, or casing, having a tapering valve-seat, of a valve-disk composed of two separate halves adapted to enter said seat, said halves having inwardly-projecting flanges with faces inclined transversely from edge to edge, one of said faces being curved, said flanges being in contact with each other, substantially as set forth.

In testimony whereof I, the said WILLIAM H. H. SHEETS, have hereunto set my hand.

WILLIAM H. H. SHEETS.

Witnesses:
ROBT. D. TOTTEN,
ROBERT C. TOTTEN.